(12) United States Patent
Saidi et al.

(10) Patent No.: US 9,697,136 B2
(45) Date of Patent: Jul. 4, 2017

(54) DESCRIPTOR RING MANAGEMENT

(71) Applicant: ARM Limited, Cambridge (GB)

(72) Inventors: Ali Ghassan Saidi, Austin, TX (US);
Anirruddha Nagendran Udipi, Austin, TX (US); Matthew Lucien Evans, Austin, TX (US); Geoffrey Blake, Austin, TX (US); Robert Gwilym Dimond, Austin, TX (US)

(73) Assignee: ARM Limited, Cambridge (GB)

( * ) Notice: Subject to any disclaimer, the term of this patent is extended or adjusted under 35 U.S.C. 154(b) by 47 days.

(21) Appl. No.: 14/494,000

(22) Filed: Sep. 23, 2014

(65) Prior Publication Data

US 2016/0085669 A1 Mar. 24, 2016

(51) Int. Cl.
*G06F 12/1027* (2016.01)

(52) U.S. Cl.
CPC .... *G06F 12/1027* (2013.01); *G06F 2212/654* (2013.01); *G06F 2212/681* (2013.01)

(58) Field of Classification Search
None
See application file for complete search history.

(56) References Cited

U.S. PATENT DOCUMENTS

| | | |
|---|---|---|
| 5,652,858 A | 7/1997 | Okada et al. |
| 5,822,788 A | 10/1998 | Kahn et al. |
| 8,972,630 B1 * | 3/2015 | Stark ............... G06F 3/0683 710/54 |
| 2004/0117555 A1 | 6/2004 | Sheaffer |
| 2009/0198906 A1 | 8/2009 | Armilli et al. |

OTHER PUBLICATIONS

UK Combined Search and Examination Report dated Feb. 10, 2016 issued in GB 1512975.2, 7 pages.
S. Lai et al, "Hardware-based Pointer Data Prefetcher" Proceedings of the 21$^{st}$ International Conference on Computer Design (ICCD'03), Oct. 13-15, 2003, pp. 290-298.
Amit, N. et al., "IOMMU: Strategies for Mitigating the IOTLB Bottleneck", ISCA Workshops, (2010), 12 pages.
Bottomley, J.E.J. et al., "Integrating DMA Into the Generic Device Model", Proceedings of the Linux Symposium, (Jul. 23-26, 2003), 5 pages.
Zhang, B. et al., "A Survey on I/O Virtualization and Optimization", IEEE Computer Society, (2010), pp. 117-123.

* cited by examiner

*Primary Examiner* — Midys Rojas
(74) *Attorney, Agent, or Firm* — Nixon & Vanderhye P.C.

(57) ABSTRACT

A data processing system utilizing a descriptor ring to facilitate communication between one or more general purpose processors and one or more devices employs a system memory management unit for managing access by the devices to a main memory. The system memory management unit uses address translation data for translating memory addresses generated by the devices into addresses supplied to the main memory. Prefetching circuitry within the system memory management unit serves to detect pointers read from the descriptor ring and to prefetch address translation data into the translation lookaside buffer of the system memory management unit.

14 Claims, 5 Drawing Sheets

DESCRIPTOR RING MANAGEMENT

BACKGROUND

This disclosure relates to the field of data processing, systems. More particularly, this disclosure relates to data processing systems including a descriptor ring for storing pointers to memory locations.

It is known to provide data processing systems which incorporate a descriptor ring to store pointers to memory locations. One use of such descriptor rings is within systems including one or more general purpose programmable processors which store pointer data within the descriptor ring such that the pointer data can be read by one or more devices from the descriptor ring and used to identify areas of buffer memory to be used by the one or more devices. The memory addressing associated with such systems may require address translation in dependence on address translation data so that a memory access by the one or more devices using the pointer from the ring descriptor can be performed. The translation data may be determined using a mechanism such as page table walking which requires a relatively large number of processing cycles to he performed, and accordingly introduces delay upon at least the first use of a pointer read from the descriptor ring.

SUMMARY

Viewed form one aspect the present disclosure provides a descriptor ring to store pointers to memory locations; and prefetching circuitry to detect pointers read from said descriptor ring, and to prefetch address translation data for memory addresses corresponding to said pointers.

The present disclosure recognises that when a pointer is read from a descriptor ring by a device, then it is likely that there will soon be a memory access to a memory address within a region identified by the pointer. Accordingly, detecting the reading of a pointer from the descriptor ring and then triggering prefetching of address translation data for memory addresses corresponding to that pointer helps reduce the delay associated with at least the first use of a pointer which requires address translation data to be obtained for that pointer.

Viewed from another aspect, the present disclosure provides descriptor ring means for storing, pointers to memory locations; and prefetching means for detecting pointers read from said descriptor ring and for prefetching address translation data for memory addresses corresponding to said pointers.

Viewed from a further aspect, the present disclosure provides storing pointers to memory locations within a descriptor ring; detecting pointers read from said descriptor ring; and prefetching address translation data for memory addresses corresponding to said pointers.

The above, and other objects, features and advantages of this disclosure will be apparent from the following detailed description of illustrative embodiments which is to be read in connection with the accompanying drawings,

DRAWINGS

Figure 1:
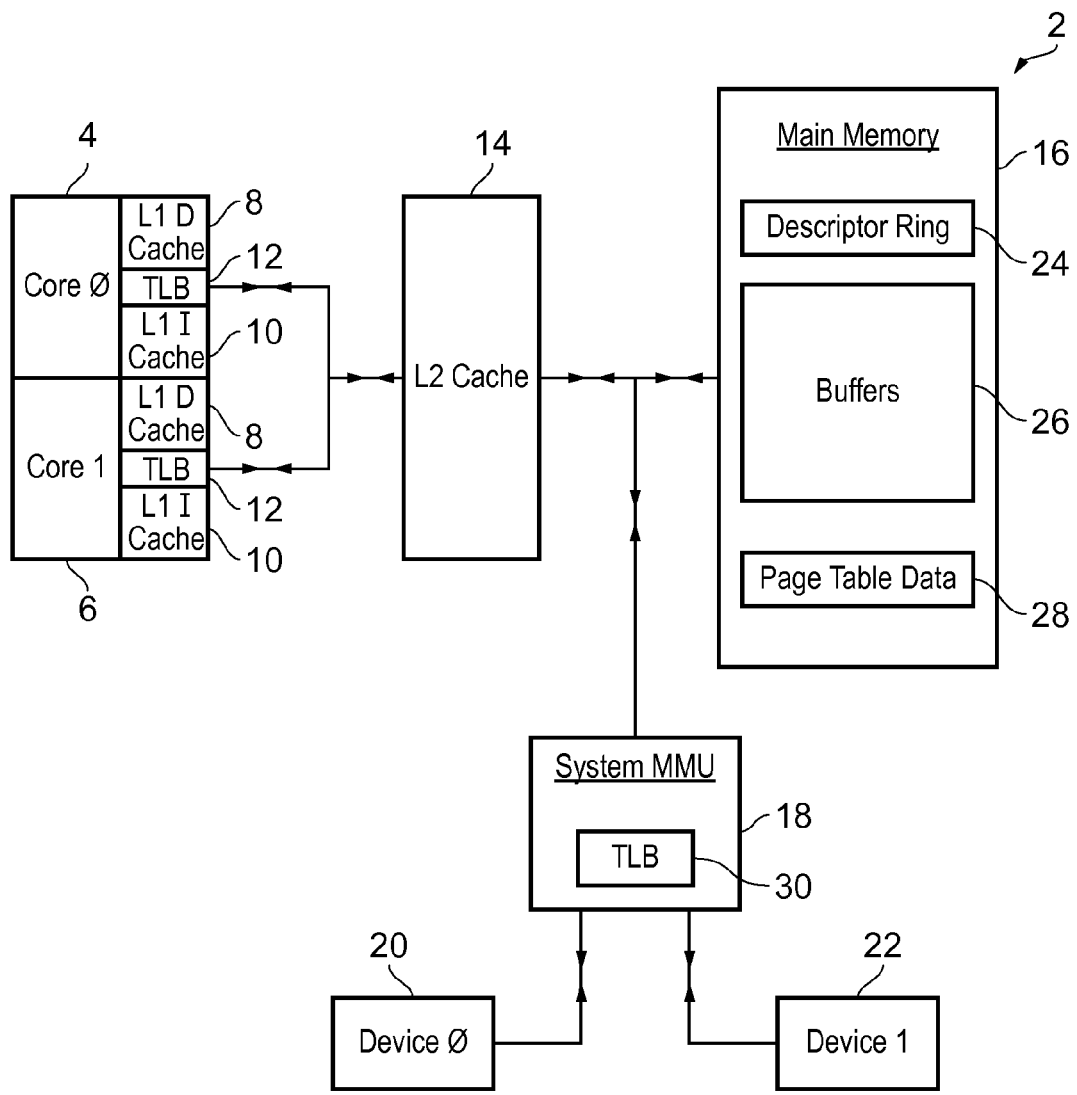
Figure 2:
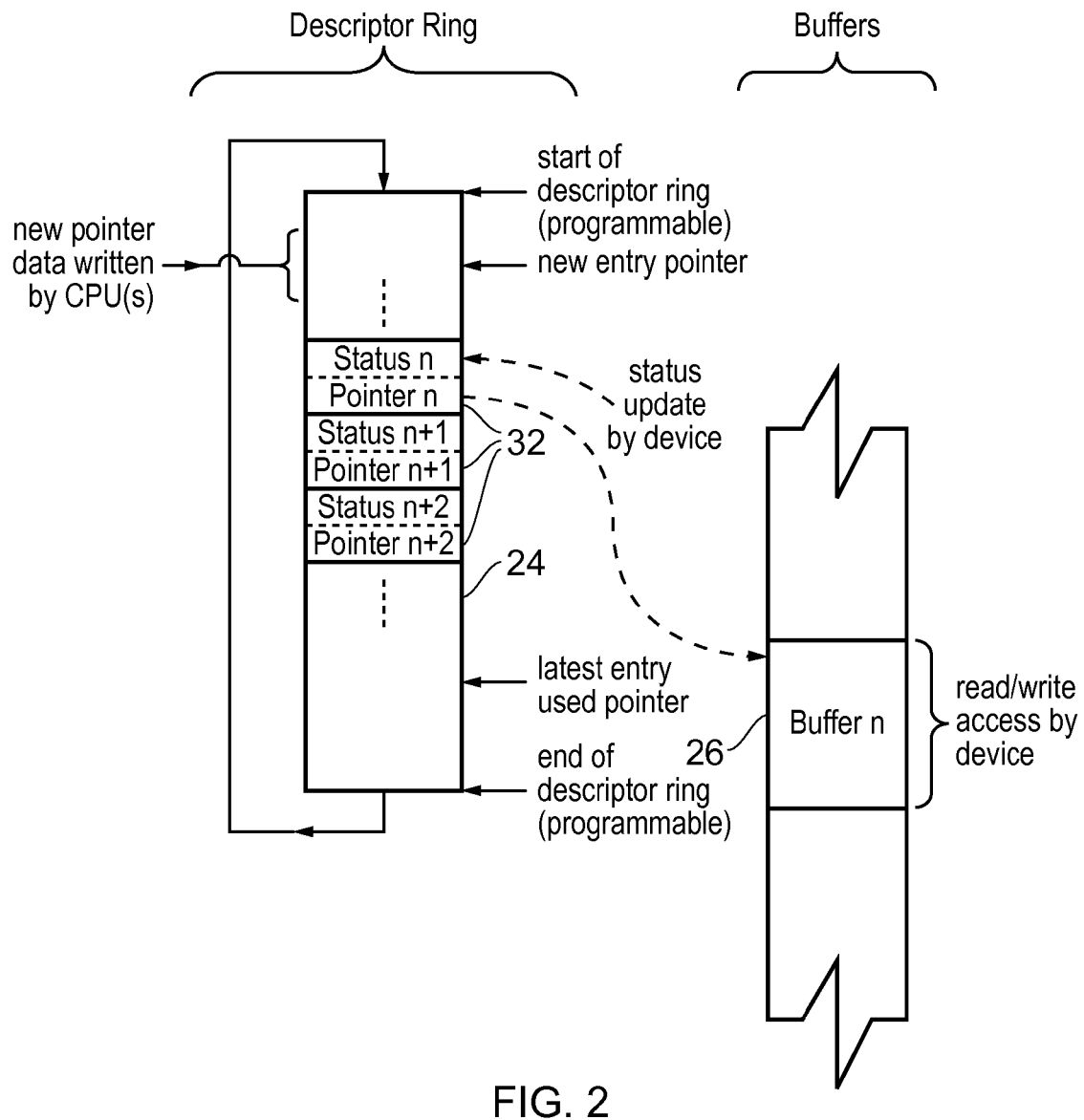
Figure 3:
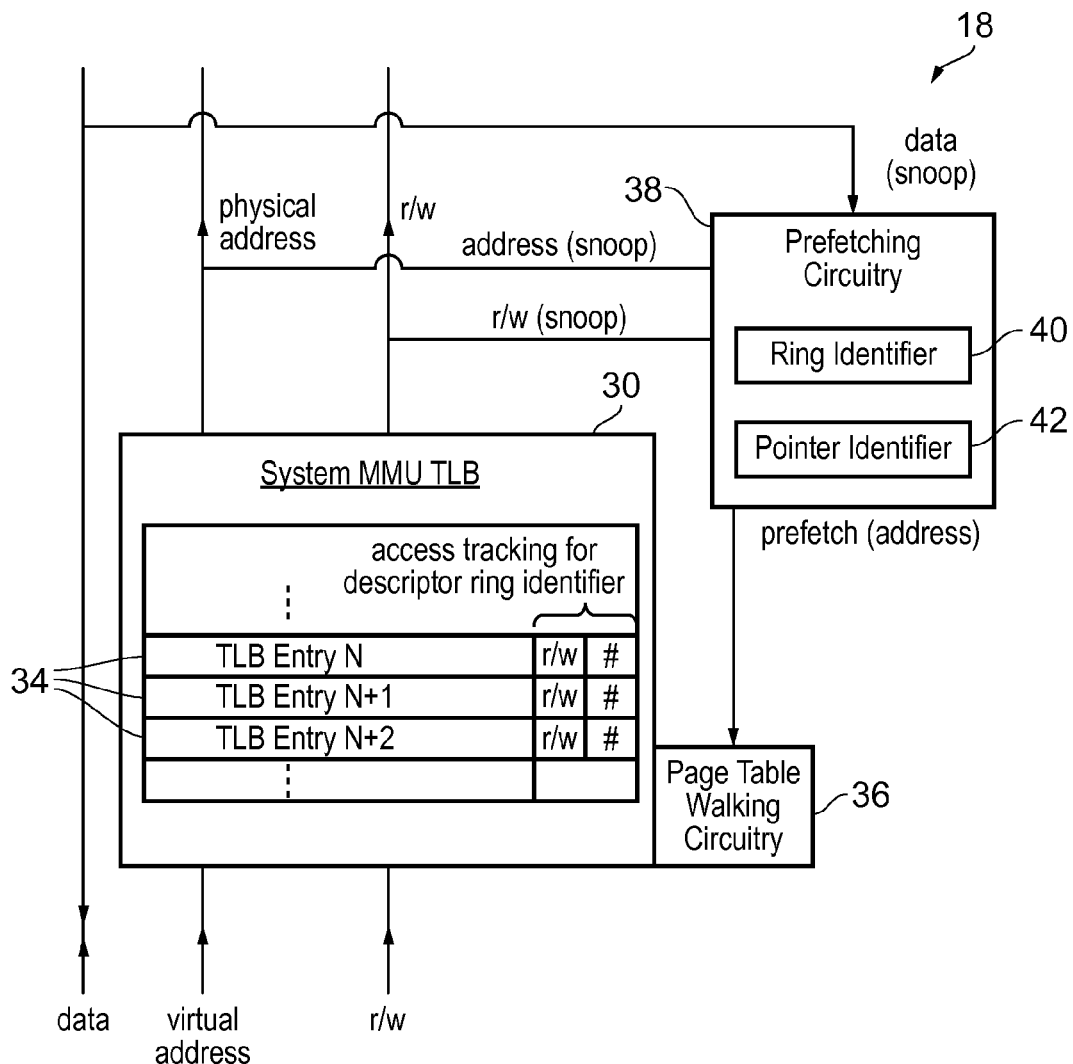
Figure 4:
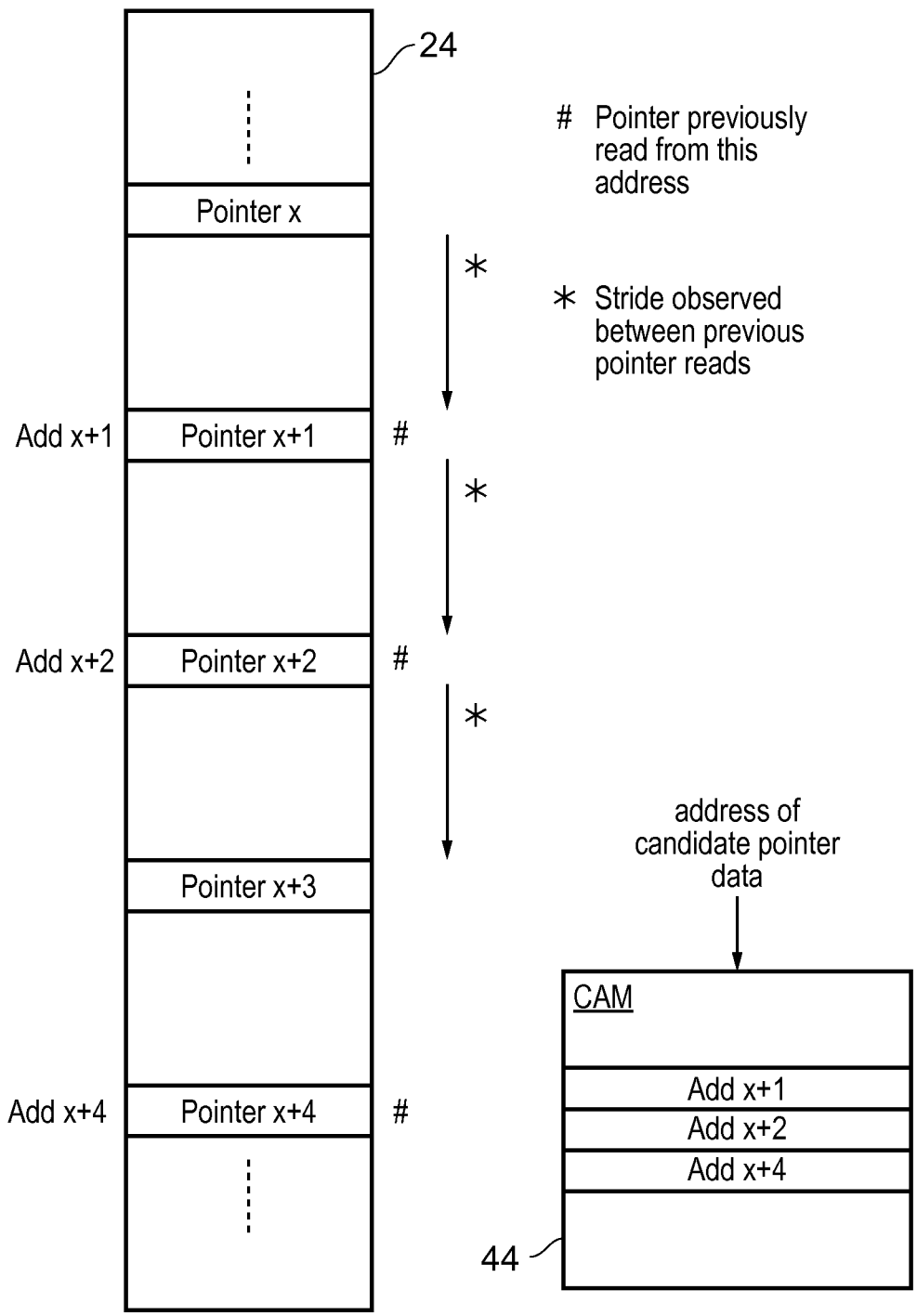
Figure 5:
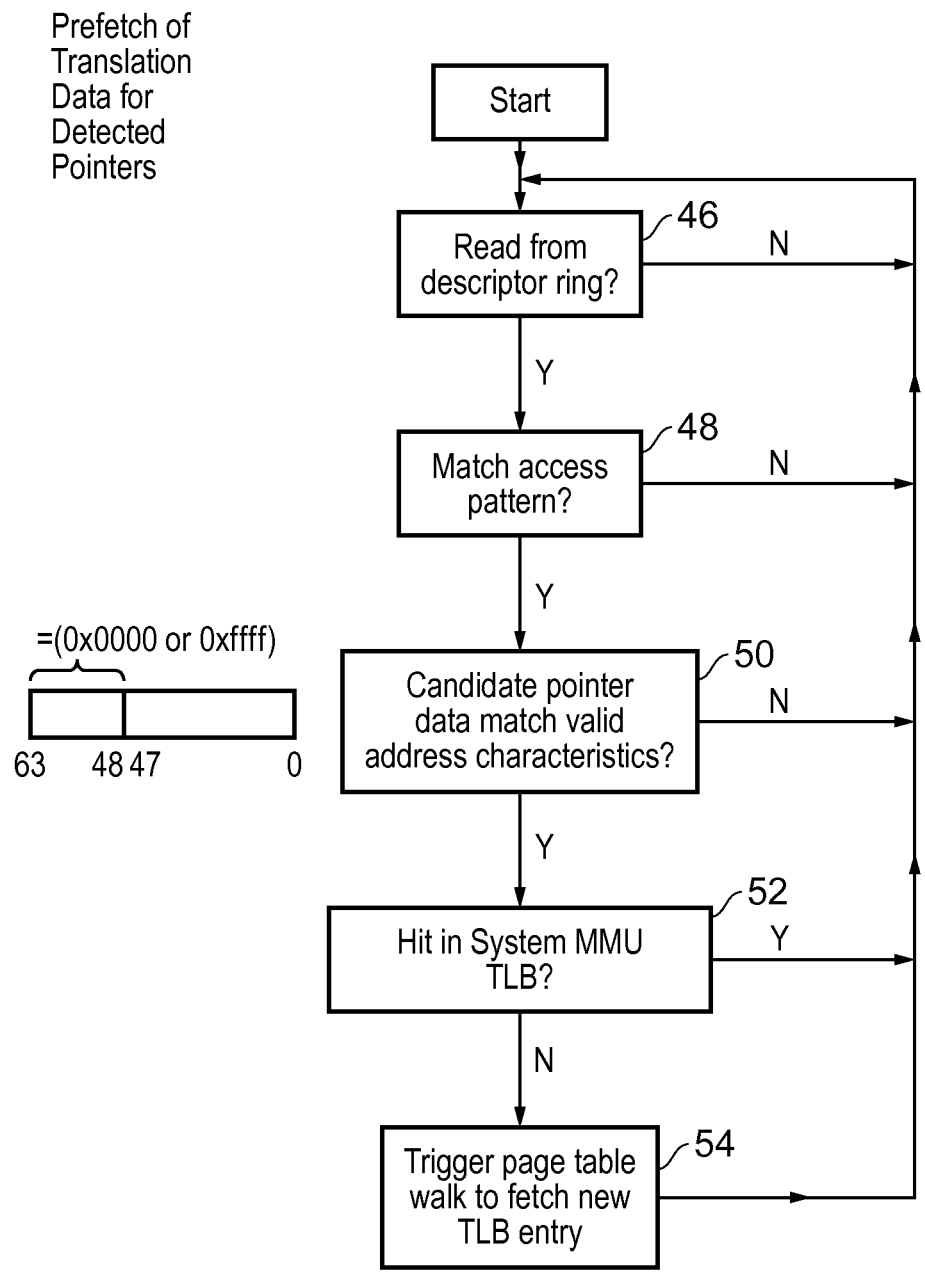

FIG. 1 schematically illustrates a data processing system including multiple general purpose processors, a system memory management unit and a plurality of devices which access a memory system using the system memory management unit;

FIG. 2 schematically illustrates the use of a descriptor ring to store pointers to buffers within a memory;

FIG. 3 schematically illustrates part of the system memory management unit;

FIG. 4 schematically illustrates identifying pointers by identifying an access pattern to a descriptor ring; and FIG. 5 is a flow diagram schematically illustrating prefetching of translation data for detected pointers.

DESCRIPTION OF EXAMPLE EMBODIMENTS

FIG. 1 schematically illustrates a data processing system 2 including a plurality of general purpose processors 4, 6, each having a level one data cache 8, a level one instruction cache 10 and a translation lookaside buffer 12 for translating from virtual addresses generated by the general purpose. processors 4, 6 to physical addresses for addressing a level two cache 14 and a main memory 16.

A system memory management unit 18 is connected to the main memory 16 and serves to manage access to the main memory 16 by a plurality of devices 20, 22. These devices may include, for example, a DMA engine, a NIC device, another general purpose processor (CPU), a graphics processing unit (GPU) or other devices which may access main memory directly themselves rather than via the general purpose processors 4, 6.

The main memory 16 stores a descriptor ring 24, buffers 26 and page table data 28. The descriptor ring 24 may he written and read by both the general purpose processors 4, 6 and the devices 20, 22. The descriptor ring 24 serves to facilitate communication between the general purpose processors 4, 6 and the devices 20, 22. The general purpose processors 4, 6 can write pointers to memory address regions within the main memory 16 which are to serve as the buffers 26 to be used by the devices 20, 22 in the processing which they perform. The devices 20, 22 read the pointers from the descriptor ring 24 to identify, the regions which are to serve as their buffers and then perform typically one of read operations from those buffers or write operations to those buffers depending upon their function. The devices 20, 22 may also update status data associated with the pointers within the descriptor ring 24 with this status data then being read by the general purpose processors 4, 6 in order to provide a channel of communication from the devices 20, 22 to the general purpose processors 4, 6.

The devices 20, 22 may use virtual addressing and accordingly the system memory management unit 18 includes a translation lookaside buffer 30 which serves to translate virtual addresses as generated by the devices 20, 22 into physical addresses required to address the main memory 16. The translation lookaside buffer 30 is configured using address translation data derived from the page table data 28 via a page table walk when a miss occurs within the translation lookaside buffer 30 for a virtual address requiring translation. The system memory management unit 18 can also store and enforce access permissions, as may be specified in the page table data 28 for different regions of memory.

FIG. 2 schematically illustrates an example relationship between the descriptor ring 24 and the buffers 26. The descriptor ring 24 is a region of the memory storing a plurality of pointers 32 which point to respective start locations of buffers 26 within the memory 16. Each of the pointers may also be associated with status data for the buffer pointed to by the associated pointer. The pointer data is written to the ring buffer 24 by the general purpose processors 4, 6. Pointer data is read from the ring buffer 24 by the devices 20, 22, The status data associated with each pointer is written/updated by the devices 20, 22.

The descriptor ring 24 in itself can be characterised by a programmable start location and a programmable end location which may be set under software control by the general purpose processors 4, 6 and later used to identify reads from the descriptor ring 24 as they will be from addresses lying in the range between the start location and the end location. Another form of programmable data specifying the descriptor ring 24 is the use of a field within the page table data 28 for the one or more memory regions that will serve as the descriptor ring 24, i.e. the memory region(s) forming the descriptor ring 24 may be flagged as such within page table data 28. Management of the entries within the descriptor ring 24 may be facilitated by the use of pointers which are maintained so as to point to the next new entry position within the descriptor ring 24 to be used by the active device(s) 20, 22, A last entry pointer associated with the descriptor ring 24 may be used to indicate to the devices 20, 22 where the next pointer they are to use can be found.

FIG. 3 schematically illustrates part of the system memory management unit 18. This includes the system memory management unit translation lookaside buffer 30 which serves to store multiple instances of address translation data 34. When a virtual address is received from one of the devices 20, 22 it is matched against these address translation data entries and if a hit occurs then the address translation data entry that hit is used to generate the appropriate physical address which is then forwarded to the main memory 16. if the virtual address misses within the translation lookaside buffer 30, then page table walking circuitry 36 serves to initiate a page table walking process through the page table data 28 to determine the appropriate address translation data to be stored within the translation lookaside buffer 30. One of the existing entries within the translation lookaside buffer 30 will be evicted, as necessary, in order to accommodate the newly fetched address translation data. Such actions of a translation lookaside buffer 30 will be familiar to those in this technical field.

Prefetching circuitry 38 serves to snoop data read from the memory 16, the physical addresses of the memory locations within the main memory 16 which are accessed as well as whether or not those accesses are reads or writes. This snooped information is used by the prefetching circuitry 38 to detect pointers read from the descriptor ring 24 and to trigger prefetching of address translation for the memory addresses corresponding to pointers read from the descriptor ring 24 if such address translation data is not already present within the translation lookaside buffer 30. More particularly, the prefetching circuitry 38 includes ring identifying circuitry 40 and pointer identifying circuitry 42.

The ring identifying circuitry 40 serves to identify from a physical address for a read operation whether or not the data being returned lies within the descriptor ring 24, in some embodiments, the software programmable start and end points of the descriptor ring 24 may be supplied to the ring identifying circuitry 40 and used to determine whether or not a read address lies within the region between the start and end points. Page table data may also be used to identify a read from the descriptor ring 24. Other embodiments may take a heuristic approach. One example heuristic approach is to identify memory regions subject to above a threshold frequency of read operations as corresponding to the descriptor ring 24. The number of read operations to a particular memory region may be tracked within, for example, additional data stored within the translation lookaside buffer entries 34 within the translation lookaside buffer 30. The address translation data corresponding to the descriptor ring 24 will have a high frequency of use and this can be recorded by the additional data fields provided within the address translation data and used by the ring identifying circuitry 40 to identify particular memory regions as corresponding to the descriptor ring Another heuristic potentially used by the ring identifying circuitry 40, possibly in combination with the previous heuristic, is that the memory regions being tracked are subject to both read and write operations as recorded within their address translation data. Devices 20, 22 will typically, in at least some embodiments, perform both reads and writes to the descriptor ring whereas they will perform either only reads or only writes to the buffers 26 pointed to by the pointers.

The pointer identifying circuitry 42 may serve to identify candidate pointer data read from the descriptor ring 24 as being a pointer if it matches one or more predetermined pointer characteristics.

These predetermined pointer characteristics may be that the candidate pointer data has a form corresponding to a valid memory address, Candidate pointer data not corresponding to a valid memory address cannot be a pointer, A more specific example of a characteristic of candidate pointer data indicative of a valid memory address is that a most significant bit portion of a predetermined length within the candidate pointer data is either all zeros or all ones.

Mother way in which the pointer identifying circuitry 42 may identify pointers is by detecting candidate pointer data read from one or more storage locations within the descriptor ring 21 matching an access pattern for previously read pointers. Such access patterns may take a variety of different forms, such as that the candidate pointer data is read from a memory address from which a pointer has previously been read. A content addressable memory may he used to store addresses of previously read pointers and the address of the candidate pointer data compared with the previous addresses within such content addressable memory to identify whether or not the address of the candidate pointer data matches the address of a previously detected pointer.

In other embodiments, the access pattern detected could be based upon an offset of the address of the candidate pointer data from a previously read pointer. This offset, if corresponding to a detected stride pattern for pointer accesses, may be used to identify the candidate pointer data as pointer data which should be subject to an address translation prefetch.

FIG. 4 schematically illustrates the above discussed examples of the storage locations within a descriptor ring 24 from which candidate pointer data is read matching an access pattern for previously read pointers. The address locations marked with an "#" are address locations from which pointers have previously been read. These addresses are stored within a content addressable memory (CAM) 44. As part of the descriptor ring 24 is read, the data that is read is put into the CAM 44. When further reads/writes from the device are seen by the system MMU 18 they are compared in the CAM 44 against that previously stored portion of the ring for any hits and mark those lines that hit has storing an address that was later requested. Periodically the system MMU 18 looks for a strided pattern of hits in that structure (e.g. every $3^{rd}$ 8-byte value) and this determines that every $3^{rd}$ 8-byte quantity is a pointer and should be prefetched.

Another option for identifying candidate pointer data as corresponding to a pointer is that it is read from a storage location within the descriptor ring 24 which is offset from a previously read pointer value by an observed stride (see entries marked "*"). As each pointer is identified when it is offset from the previous pointer may be used to generate a stride value which can then be used to predict whether candidate pointer data corresponds to a pointer before that data is identified and used as a pointer by one of the devices 20, 22.

FIG. 5 is a flow diagram schematically illustrating prefetch of translation data for detected pointers. At step 46 processing waits until there is a read from the descriptor ring 24. When there is a read from the descriptor ring 24, then step 48 determines whether or not the storage locations for that read match a predetermined access pattern indicative of the read being of a pointer. If there is no match, then processing returns to step 46, if the storage location of the read from the descriptor ring 24 does match the access pattern, then processing proceeds to step 50 where the candidate pointer data is checked to determine if it matches a. valid address, e.g. its most significant bits are all zeros or all ones as illustrated. If the candidate pointer data does not correspond to a valid address, then processing again returns to step 46. If the candidate pointer data identified does correspond to a valid address, then processing proceeds to step 52 where a determination is made as to whether or not that address hits within the translation lookaside buffer 30. If there is a hit, then the address translation for that pointer has already been retrieved from the page table data 28 and no prefetching is required. If there is a miss within the translation of the lookaside buffer 30, then processing proceeds to step 54 where a page table walk performed by the page table walking circuitry 36 is triggered so as to retrieve the address translation data for the newly encountered pointer. Processing then returns to step 46.

Another possible example embodiment(s) is one in which the descriptor ring 24 may be identified by transaction hint bits on a bus, such as a PCIe bus, that indicate what is the intended read/write pattern for a request. Other possibilities include that a device could indicate to the system MMU 18 which reads correspond to the descriptor ring 24 reads, the device could provide hints about which reads correspond to the descriptor ring 24 reads, or the bus connecting the device to the system MMU 18 provides hints about use/reuse which could be used to determine what is a descriptor ring 24 (e.g. indicating that a certain location will include a substantial amount of reuse would be a good indicator).

The descriptor ring 24 is typically populated with the pointer data by the action of one or more general purpose processor 4, 6 executing program instructions that write the pointer data into the descriptor ring 24. Thereafter, one or more devices read the pointer data from the descriptor ring 24 to identify memory regions allocated for use by the one or more devices, such as a DMA device, a MC device, another CPU, a CPU, etc.

In at least some embodiments a system memory management unit 18 is provided to manage access by the one or more memory devices to memory locations within a memory 16. This system memory management unit 18 may use the address translation data to translate a device memory address generated by the one or more devices into a physical memory address to be supplied to the memory. The system memory management unit 18 may also provide other or alternative functions, such as controlling access permissions to different memory address space regions within the memory by the one or more devices.

Whilst it will be appreciated that the address translation data could be accessed in a variety of different ways, one efficient way of providing address translation data is to use page table walking circuitry 36 to determine the address translation data by performing a page table walk through page table data. While use of such a page table walking techniques may be an efficient and flexible way of representing memory system configuration, it suffers from the disadvantage of requiring a relatively slow page table walking process in order to access new address translation data. Tile prefetching of address translation data for detected pointers helps address this issue in such example embodiments.

The descriptor ring 24 may be identified by the prefetching circuitry 38 in a variety different ways. In some embodiments the prefetching circuitry may read one or more programmable descriptor ring identifiers (e.g. register values or page table entries) specifying one or more regions of a memory address space which serve as the descriptor ring. Thus, the software programmer can effectively specify to the prefetching circuitry which regions of memory are to be treated as the descriptor ring from which the reading of pointers is to be detected.

In other example embodiments, the prefetching circuitry may include ring identifying circuitry 40 which serves to identify the descriptor ring 24 as one or more regions of a memory address space that are subject to read at above a threshold frequency by the one or more devices. A characteristic of the descriptor ring 24 is that it will tend to be read at a relatively high frequency by the devices relative to the frequency at which other regions of the memory address space are read. Accordingly, the memory regions which serve as the descriptor ring may be identified by this characteristic of having a read frequency which is above a threshold level (possible programmable or heuristically determined).

Another possible way in which the prefetching circuitry may identify the descriptor ring is with ring identifying circuitry 40 which identifies the descriptor ring as one or more regions of the memory address space which is subject to both reads and writes by the one or more devices. Typically the one or more devices 20, 22 will serve to either read or write to general memory regions within the memory address space, but not both, whereas both reads and writes will tend to be performed to the descriptor ring as the pointers will be read from the descriptor ring and status updates for the buffer regions 26 written to the descriptor ring 24 in order that such status updates can be reported back to one or more general purpose processors 4, 6 as required.

The prefetching circuitry may in some embodiments comprise pointer identifying circuitry 42 serving to identify pointers read from the descriptor ring by detecting candidate pointer data having one or more predetermined characteristics. Accordingly, the data read from the descriptor ring 24 may be examined to determine if it has the one more predetermined characteristics and if so, identified as a pointer.

The one or more characteristics of the candidate pointer data could take a variety of forms, but in some example embodiments may be characteristics which identify the candidate pointer data as a valid memory address. In some embodiments, these characteristics corresponding to a valid memory address may be without a most significant bit portion of a predetermined length of the candidate pointer data is either all zeros or all ones (such a form is often used within large memory address spaces where only either the top portion or the bottom portion are in practice necessary), In some example embodiments, the prefetching circuitry 38 may include pointer identifying circuitry 42 by identifying pointers by detecting candidate pointer data read from one or more storage locations within the descriptor ring matching an access pattern for previously read pointers. This access pattern may have a variety of forms, such as the candidate pointer data being read from within the descriptor ring 24 at an address previously identified as storing a pointer within the descriptor ring 24. Typical descriptor rings may serve to re-use the locations at which pointers are stored and/or the translation data for a given pointer may be flushed, but the pointer then accessed again, at which time it can quickly identified as being a pointer as it has been previously recognised and then the translation data be fetched. A content addressable memory 44 provides a high performance mechanism which may be used in some embodiments to store previous pointer addresses so as to permit quick comparisons with a candidate address for candidate pointer data. Another example form of a matching access pattern comprises a read from a candidate address within the descriptor ring having an offset from a previously read pointer matching a detected stride pattern for pointer accesses. The pointer data within the descriptor ring may typically be laid out in a repeating pattern with a characteristic stride between pointer values. Once this stride is identified (e.g. heuristically), then the identification of a given pointer can he used to predict that data read from a location spaced by the stride length from that given pointer will also be a pointer value and may be usefully subject to address translation prefetching.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. Apparatus comprising:
    a descriptor ring to store pointers to memory locations; and
    prefetching circuitry to detect pointers read from said descriptor ring and to prefetch address translation data for memory addresses corresponding to said pointers, wherein:
    said prefetching circuitry is configured to identify said descriptor ring using one or more programmable descriptor ring identifiers specifying one or more regions of a memory address space serving as said descriptor ring and includes pointer identifying circuitry to identify said pointers by detecting candidate pointer data read from said descriptor ring having one or more predetermined pointer characteristics,
    said one or more predetermined pointer characteristics are that one or more fields within said candidate pointer data match one or more predetermined values corresponding to a valid memory address, and
    said one or more predetermined values are a most significant bit portion of a predetermined length of said candidate pointer data is all zeros or all ones.

2. Apparatus as claimed in claim 1, comprising one or more general purpose processors to execute program instructions that write said pointers to said descriptor ring and additionally one or more devices that read said pointers from said descriptor ring to identify memory regions allocated for use by said one or more devices.

3. Apparatus as claimed in claim 2, comprising a system memory management unit to manage access by said one or more devices to memory locations within a memory, said system memory management unit using said address translation data to translate a device memory address generated by said one or more devices into a physical memory address to be supplied to said memory.

4. Apparatus as claimed in claim 3, comprising page table walking circuitry to determine said address translation data by performing a page table walk through page table data.

5. Apparatus as claimed in claim 2, wherein said prefetching circuitry comprises ring identifying circuitry to identify said descriptor ring as one or more regions of a memory address subject to reads at above a threshold frequency by said one or more devices.

6. Apparatus as claimed in claim 2, wherein said prefetching circuitry comprises ring identifying circuitry to identify said descriptor ring as one or more regions of a memory address subject to both reads and writes by said one or more devices.

7. Apparatus as claimed in claim 1, wherein said one or more programmable descriptor ring identifiers comprise flags within page table data for said one or more regions of a memory address space serving as said descriptor ring.

8. Apparatus as claimed in claim 1, wherein said prefetching circuitry comprising ring identifying circuitry to identify memory accesses to said pointers using hint data accompanying bus transactions and indicative of said bus transactions being memory accesses to said pointers.

9. Apparatus as claimed in claim 1, wherein said prefetching circuitry comprises pointer identifying circuitry to identify said pointers by detecting candidate pointer data read from one or more storage locations within said descriptor ring matching an access pattern for previously read pointers.

10. Apparatus as claimed in claim 9, wherein said matching an access pattern comprises reading from a candidate address within said descriptor ring identified as having previously stored a pointer.

11. Apparatus as claimed in claim 10, wherein said pointer identifying circuitry comprises a content addressable memory to store previous pointer addresses within said ring buffer from which a pointer has been read and said candidate address is compared with said previous pointer address using said content addressable memory.

12. Apparatus as claimed in claim 9, wherein said matching an access pattern comprises read from a candidate address within said descriptor ring having an offset from a previously read pointer matching a detected stride pattern for pointer accesses.

13. Apparatus comprising:
    descriptor ring means for storing pointers to memory locations; and
    prefetching means for detecting pointers read from said descriptor ring and for prefetching address translation data for memory addresses corresponding to said pointers, wherein:
    said prefetching means is configured to identify said descriptor ring using one or more programmable descriptor ring identifiers specifying one or more regions of a memory address space serving as said descriptor ring and includes pointer identifying means for identifying said pointers by detecting candidate pointer data read from said descriptor ring having one or more predetermined pointer characteristics,
    said one or more predetermined pointer characteristics are that one or more fields within said candidate pointer data match one or more predetermined values corresponding to a valid memory address, and said one or more predetermined values are a most significant bit portion of a predetermined length of said candidate pointer data is all zeros or all ones.

14. A method comprising the steps of:

storing pointers to memory locations within a descriptor ring;

detecting pointers read from said descriptor ring;

prefetching address translation data for memory addresses corresponding to said pointers;

identifying said descriptor ring using one or more programmable descriptor ring identifiers specifying one or more regions of a memory address space serving as said descriptor ring; and identifying said pointers by detecting candidate pointer data read from said descriptor ring having one or more predetermined pointer characteristics, wherein said one or more predetermined pointer characteristics are that one or more fields within said candidate pointer data match one or more predetermined values corresponding to a valid memory address, and wherein said one or more predetermined values are a most significant bit portion of a predetermined length of said candidate pointer data is all zeros or all ones.

* * * * *